(12) United States Patent
Hebenstreit et al.

(10) Patent No.: US 6,386,587 B1
(45) Date of Patent: May 14, 2002

(54) ADJUSTING ARRANGEMENT FOR A STEERING COLUMN TUBE OF A STEERING SYSTEM OF A MOTOR VEHICLE

(75) Inventors: Axel Hebenstreit, Stuttgart; Thorsten Meyer, Aidlingen; Karl Peitsmeier, Remseck-Aldingen; Gottfried Schremmer, Tamm, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/617,741

(22) Filed: Jul. 17, 2000

(30) Foreign Application Priority Data

Jul. 17, 1999 (DE) .......................................... 199 33 678

(51) Int. Cl.⁷ ................................................. B62D 1/18
(52) U.S. Cl. ........................... 280/775; 74/493; 74/527; 74/534
(58) Field of Search ............................ 280/775; 74/493, 74/527, 529, 530, 534

(56) References Cited

FOREIGN PATENT DOCUMENTS

| DE | 3890516 C2 | 2/1998 | | |
|---|---|---|---|---|
| EP | 0802104 A1 | 1/1997 | | |
| JP | 03067778 A | * | 3/1991 | ............ B62D/1/18 |
| JP | 03067779 A | * | 3/1991 | ............ B62D/1/18 |
| JP | 03067780 A | * | 3/1991 | ............ B62D/1/18 |
| JP | 04024166 A | * | 1/1992 | ............ B62D/1/18 |

* cited by examiner

Primary Examiner—Lanna Mai
Assistant Examiner—Paul Royal, Jr
(74) Attorney, Agent, or Firm—Crowell & Moring LLP

(57) ABSTRACT

Adjusting arrangement for a steering column tube of a steering system of a motor vehicle having a swivellably disposed clamping lever which, in a released position, unblocks or, in a locked position, blocks a longitudinal or vertical displacement of the steering column tube, and has an actuating device for the manual releasing or locking of the clamping lever, which actuating device has a grip arrangement which, in a vehicle-fixed mounted condition, is accessible from a driver seat position. A guide rail arrangement is positioned on the steering column tube and is aligned in the longitudinal direction of the steering column tube. An adjusting slide block is displaceably held on the guide rail arrangement. The slide block is moved by the grip arrangement and is connected with the clamping lever.

15 Claims, 5 Drawing Sheets

ADJUSTING ARRANGEMENT FOR A STEERING COLUMN TUBE OF A STEERING SYSTEM OF A MOTOR VEHICLE

BACKGROUND AND SUMMARY OF THE INVENTION

This application claims the priority of German application 19933678.4, filed Jul. 17, 1999, the disclosure of which is expressly incorporated by reference herein.

The invention relates to an adjusting arrangement for a steering column tube of a steering system of a motor vehicle, having a swivellably disposed clamping lever which, in a released position, unblocks or, in a locked position, blocks a longitudinal or vertical displaceability of the steering column tube. The arrangement also includes an actuating device for the manual releasing or locking of the clamping lever, which actuating device has a grip arrangement which, in a vehicle-fixed mounted condition, is accessible from a driver seat position.

An adjusting arrangement for a steering column tube of a steering system of a passenger car is generally known. In order to be able to change a steering wheel of a driver position of the passenger car in its height as well as in its depth relative to a dashboard of the vehicle interior and relative to the driver's sitting position, the steering column tube of the steering system is disposed in a vehicle-fixed manner by means of the adjusting arrangement. The adjusting arrangement has a clamping bolt which penetrates lamellar bundles on both sides of the steering column tube which are alternatingly provided with oblong holes extending in the longitudinal or vertical direction. On the clamping bolt penetrating the oblong holes, a clamping mechanism is arranged which, as a result of swivelling movements of the clamping bolt about its longitudinal axis, presses the lamellar bundles against one another or releases them. By means of the clamping mechanism, the flexible lamellae are pressed against the lateral fixed lamella which itself is supported on the stationary console. For swivelling the clamping bolt, a clamping lever is fixed on one end and is connected with a manual actuating device. The manual actuating device is accessible from the driver position, so that, as a result of a manual operation of the actuating device by the driver, the clamping lever can be released. Subsequently the steering wheel, including the steering column tube, can be adjusted into the desired position and then the clamping lever can be locked again.

It is an object of the invention to provide an adjusting arrangement of the initially mentioned type which ensures a simple, secure and comfortable operation.

This object is achieved in that a guide rail arrangement is arranged on the steering column tube so that it is aligned in the longitudinal direction of the steering column tube. On the guide rail arrangement, an adjusting slide block is slidable held and can be moved by the grip arrangement and which is connected with the clamping lever. Because the adjusting slide block is held on the guide rail arrangement which is fixed to the steering column tube, all forces occurring during the releasing or locking of the clamping lever, as well as during the adjustment of the steering column tube, are absorbed in the steering column tube, so that a constant, easy-motion and secure releasing and locking function of the clamping lever is provided. The grip arrangement, which can be operated from the driver position, can be easily and comfortably operated because it provides for the linear adjustment of the adjusting slide block.

In an embodiment of the invention, the guiding of the adjusting slide block on the guide rail arrangement, the swivel bearing of the clamping lever and a bearing of the grip arrangement are coordinated with respect to their guiding and bearing friction forces so that, during a longitudinal adjustment of the steering column tube, the steering-column-tube-fixed guide rail arrangement can be displaced with respect to the adjusting slide block held stationary by the clamping lever and the grip arrangement. As a result, during a longitudinal adjustment of the steering column tube, the grip arrangement remains stationary, so that, after the desired adjusting of the steering wheel and of the steering column tube, the driver finds the grip arrangement in the same position in which he had released it.

As a further development of the invention, the adjusting slide block is connected with the clamping lever by means of a coupling unit which compensates the translational mobility of the adjusting slide block with respect to the rotary mobility of the clamping lever. The coupling unit preferably has a guide bolt which is positioned in an oblong hole of the clamping lever. The oblong hole of the clamping lever has a dimensioned length such that the adjusting slide block, connected at least essentially rigidly with the guide bolt, can carry out its displacement movements between the end positions without the occurrence of distortions relative to the clamping lever.

In another embodiment of the invention, a tolerance compensation unit is integrated in the connection between the adjusting slide block and the clamping lever or the adjusting slide block and the grip arrangement. As a result, it is also ensured that mounting and manufacturing tolerances of the individual components do not impair the secure and easy-motion operation of the adjusting arrangement. In addition, the grip arrangement, which is accessible from the driver position, is always in the same inoperative position irrespective of the existing tolerances.

In another embodiment of the invention, the tolerance compensation unit is designed as a setting mechanism provided between the clamping lever and the adjusting slide block. As a result, it is possible to carry out a precise setting of the adjusting device irrespective of the existing tolerances.

In another embodiment of the invention, the setting mechanism, on the one hand, has a setting rod provided with teeth and, on the other hand, has a stop slide which can be displaced on the setting rod and has a locking member provided with corresponding teeth, which locking member can be manually changed into a released position and is spring-loaded such that it can automatically be restored into its locking position. This ensures a particularly simple setting of the adjusting arrangement.

The object according to the invention is also achieved in that the grip arrangement is displaceably disposed by means of a bearing in a vehicle-fixed steering column tube collar, which bearing has bearing elements which have such a play that the grip arrangement can carry out compensation movements about at least one axis extending transversely to the sliding direction. This ensures an easy-motion and a functionally secure operation of the grip arrangement. Deformations between the bearing in the steering column tube collar and the grip arrangement are avoided so that a low-noise operation of the grip arrangement is permitted. The essentially translational displacement movement of the grip arrangement provides an ergonomically favorable operation by the driver of the motor vehicle.

In another embodiment of the invention, the grip arrangement has an elongated grip arm which is coupled at one end to the adjusting slide block and, at the other end, has a grip element which is accessible from the driver seat position. The gripping arm is preferably made of a plastic material.

In another embodiment of the invention, the coupling of the gripping arm to the adjusting slide block is designed as a releasable locking mechanism. This creates a secure linking of the grip arrangement to the adjusting slide block which prevents an unintentional detaching of the gripping arm from the adjusting slide block.

In another embodiment of the invention, the gripping arm extends radially through a central opening of a bearing roller serving as a bearing element, which bearing roller is rotatably disposed about a horizontal axis of rotation extending transversely to the sliding direction of the gripping arm. In another embodiment, the recess of the bearing roller through which the gripping arm protrudes is larger in its width as well as in its height than the outer dimensions of the gripping arm. As a result, the compensating play is created for the gripping arm which permits an easy-motion and functionally secure actuating of the grip arrangement by means of the gripping element.

In another embodiment of the invention, spring elements are integrated in the bearing roller, which spring elements hold the gripping arm under prestress in a central guiding position. This embodiment avoids or at least reduces a rattling or any other generating of noise.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
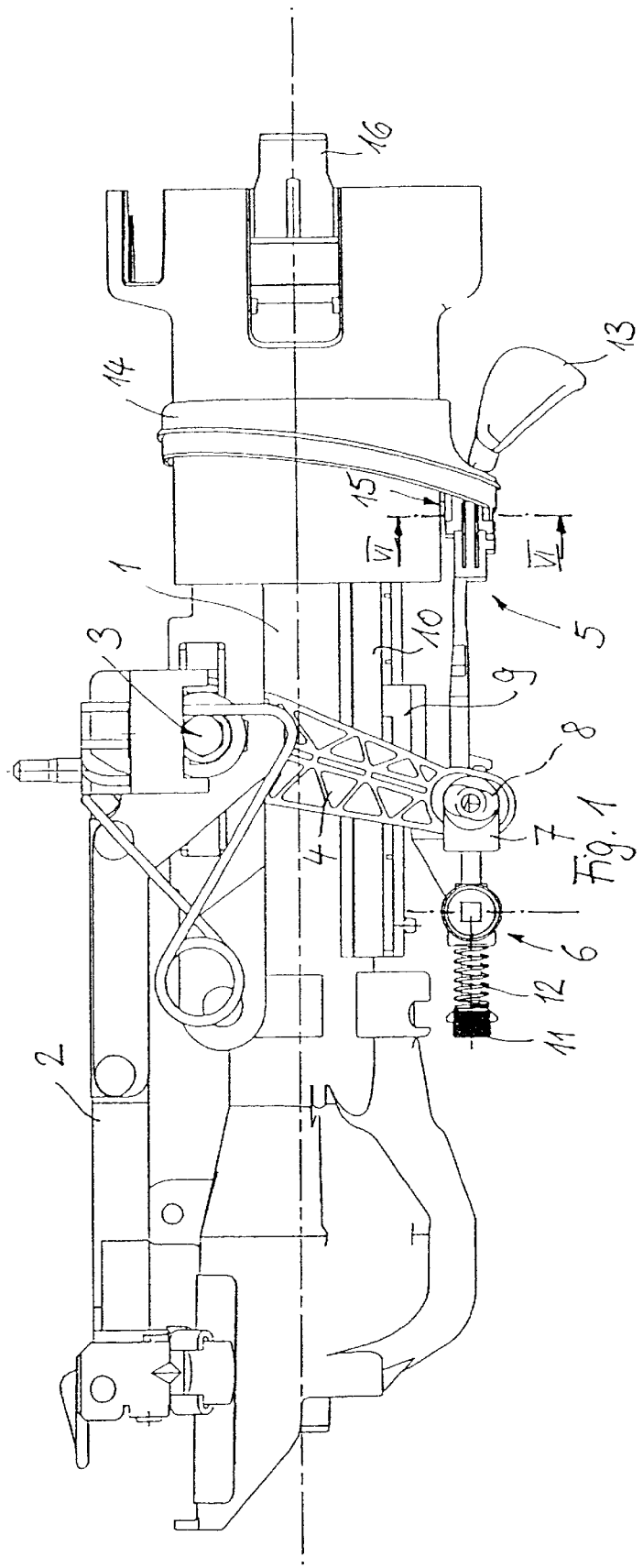
FIG. 1 is a lateral view of a steering column tube of a steering system of a passenger car with an embodiment of the adjusting arrangement according to the invention.
Figure 2:
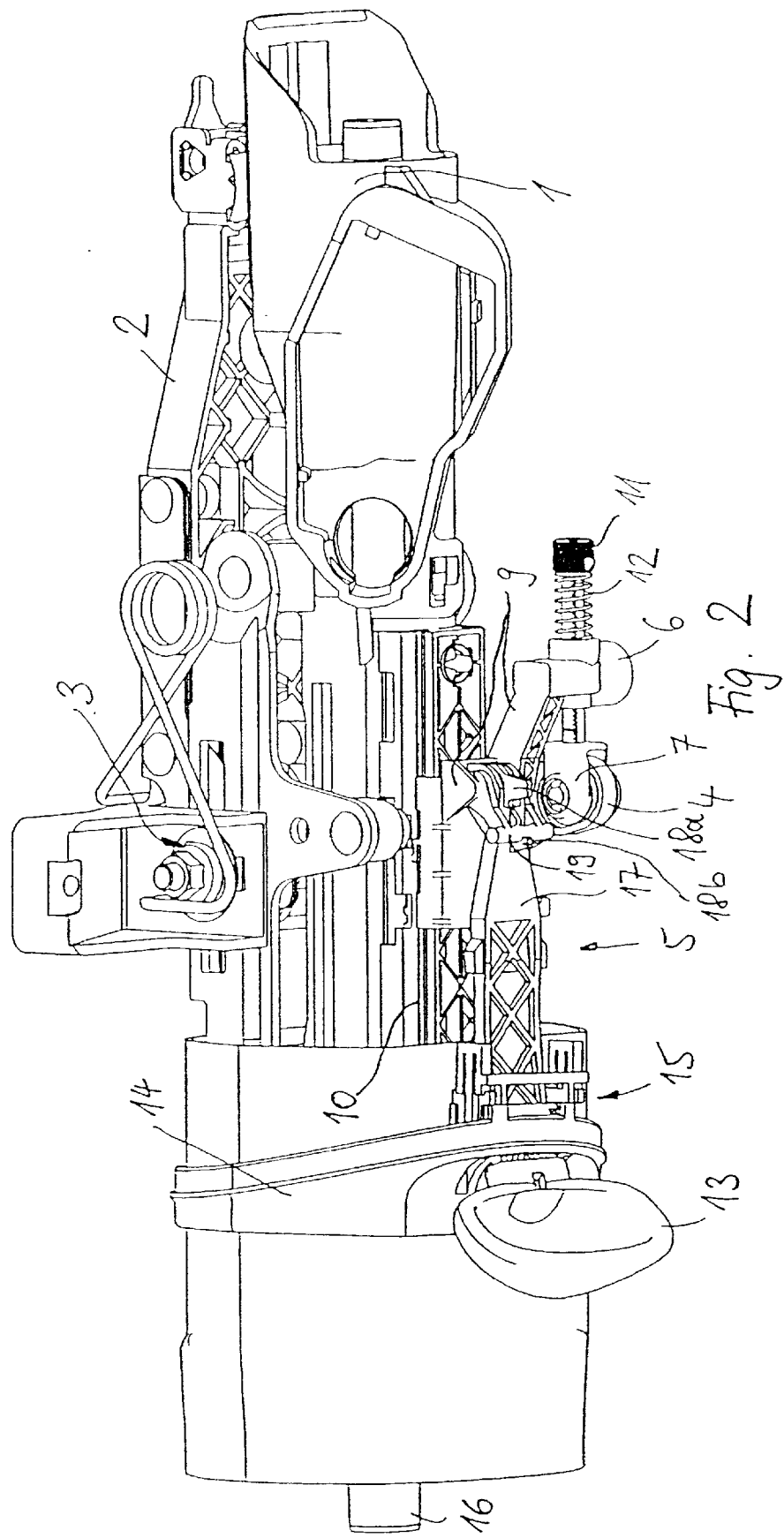
FIG. 2 is a perspective illustration from below of the steering column tube with the adjusting arrangement according to FIG. 1.

A steering column tube according to FIGS. 1 and 2 is part of a steering system for a passenger car. The steering column tube 1 is adjustable in its longitudinal direction as well as in its height on a vehicle-fixed console 2. A steering column, which is rotatably disposed in the steering column tube 1 carries a steering wheel on a front end 16 which, in the mounted condition, projects into a driver area of an interior of the passenger car. As a result of a corresponding longitudinal and/or vertical adjustment of the steering column 1, the steering wheel can be adjusted relative to a sitting position of the driver of the passenger car in the height as well as in the depth, that is, at a distance from a dashboard of the interior.

In a basically known manner, lamellar bundles, which are not shown in detail, are provided for the adjustment of the steering column tube 1 in the longitudinal and/or vertical direction on both sides of the steering column tube 1, which lamellar bundles have oblong holes which alternatingly extend in the longitudinal and vertical direction. Transversely to the longitudinal direction of the steering column tube, the oblong holes of the lamellar bundles are penetrated by a clamping bolt 3 which, in a basically known manner, is provided with a clamping mechanism for the clamping or releasing of the lamellar bundles. The clamping bolt 3 can be swivelled about its axis of rotation by means of a clamping lever 4 arranged laterally of the steering column tube 1, whereby a clamping or a release of the lamellar bundles is achieved. During a clamping of the lamellar bundles, an adjustment of the steering column tube 1 relative to the vehicle-fixed console is blocked. During the corresponding swivelling of the clamping lever for a release of the lamellar bundles, the steering column tube 1 can be displaced in the longitudinal and/or vertical direction.

The clamping lever 4 can be swivelled by an adjusting device which will be described in detail in the following and which can be manually operated from the driver's sitting position.

The adjusting arrangement is connected by way of a coupling unit 7, 8 and a tolerance compensation unit 6, 11, 12 with an adjusting slide block 9 which is slidably in the longitudinal direction of the steering column tube 1 held on a guide rail arrangement 10 fixed to the steering column tube. In order to compensate for the differences in height which occur during the swivelling motion of clamping lever 4 with respect to the translational displacing movement of the adjusting slide block 9 between the opposite end positions of the clamping lever 4, the coupling unit 7, 8 has an oblong hole 8 in the clamping lever 4 at the connection point with the clamping lever 4, through which oblong hole 8 a connection bolt penetrates of a holding fork 7 of the coupling unit 7, 8. The holding fork 7 is rigidly connected with a setting rod 26 (FIG. 7) which, by way of the tolerance compensation unit 6, 11, 12, is rigidly connected with a connection arm of the adjusting slide block 9. The connection arm is molded in one piece to the adjusting slide block 9.

As illustrated particularly in FIG. 2, a grip arrangement 5 is applied to the adjusting slide block 9, which grip arrangement 5 projects away from the adjusting slide block 9 on the side situated opposite the tolerance compensation unit 6, 11, 12. The grip arrangement 5 therefore projects along the steering column tube 1 toward the vehicle interior and thus toward the steering wheel of the steering system. On its free end, the grip arrangement 5 carries a gripping element in the form of a gripping cup 13 which, on the side of the vehicle interior, projects out of a steering column tube collar 14. By means of a bearing 15 described in detail in the following, the grip arrangement 5 is longitudinally displaceably disposed in the steering column tube collar 14 and, while play is compensated, is movably in axes extending transversely to the longitudinal displaceability.

Figure 3:
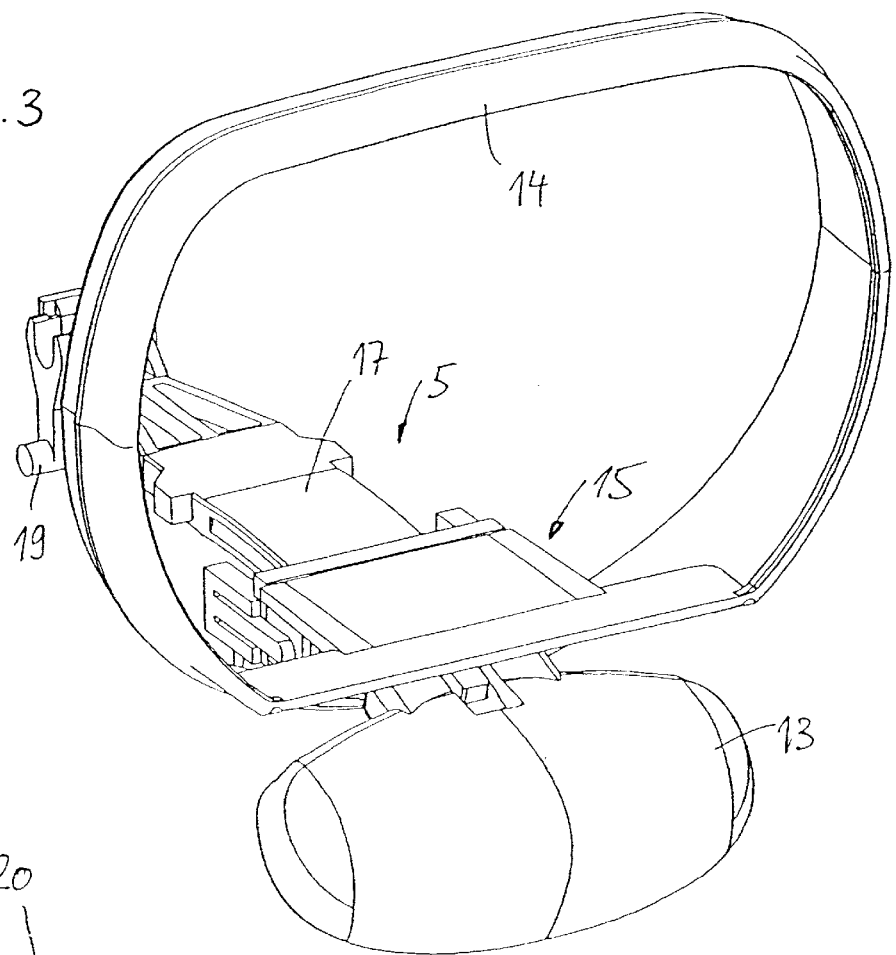
FIG. 3 is an enlarged perspective representation of a grip arrangement of the adjusting arrangement according to FIG. 1 and 2 disposed in a steering column tube collar.
Figure 4:
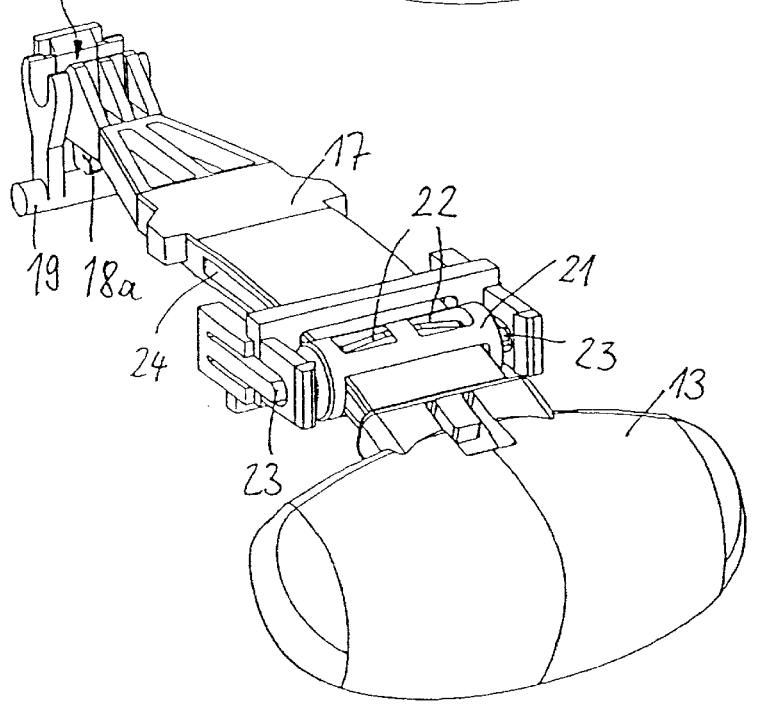
FIG. 4 is a perspective representation of the grip arrangement according to FIG. 3, however, without showing the steering column tube collar.
Figure 5:
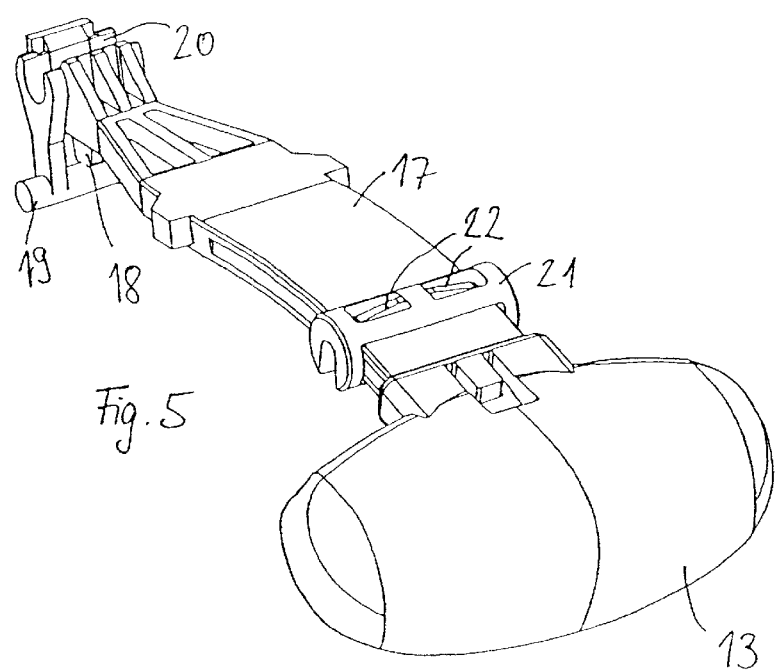
FIG. 5 is a view of the grip arrangement according to FIG. 4 with the further omission of a part of its bearing.
Figure 6:
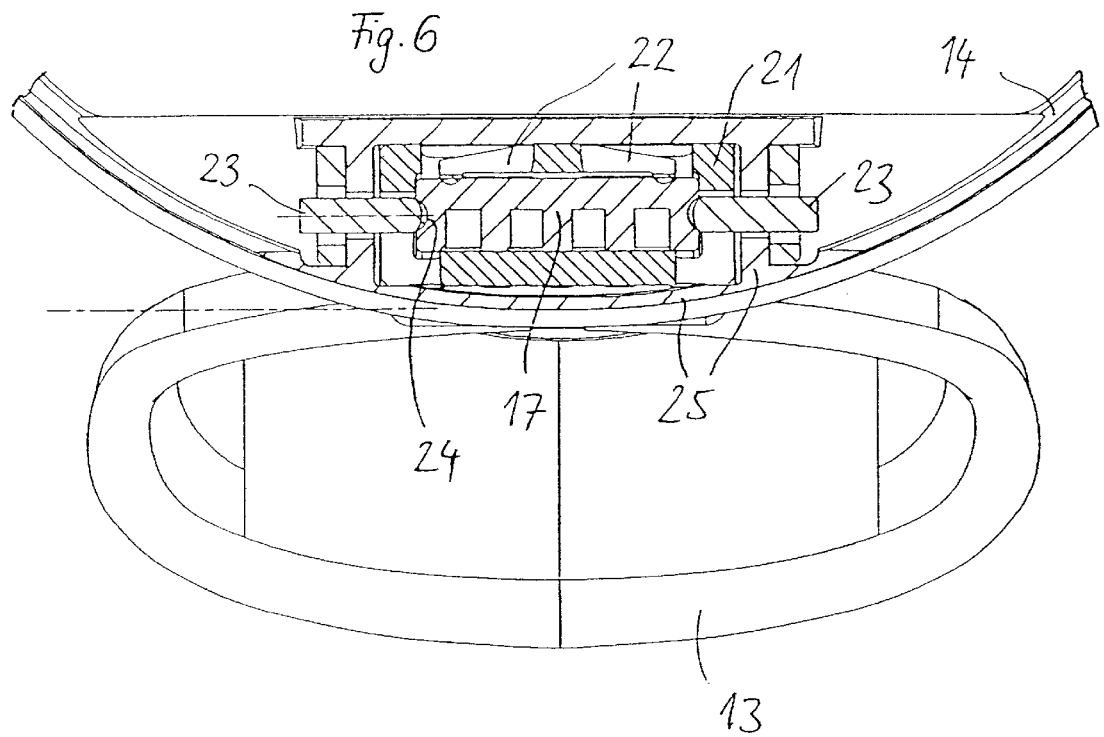
FIG. 6 is an enlarged sectional representation of a cross-sectional view of the bearing of the grip arrangement along the intersection Line VI—VI in FIG. 1.

The grip arrangement 5 has a gripping arm 17 which is made of a plastic material. On its one end, the gripping arm 17 carries the gripping cup 13. At the opposite end, it is provided with a holding device 18 to 20 (FIGS. 3 to 5) which can be releasably connected with a bow area of the adjusting slide block 9. The holding device 18 to 20 has a receiving device 20, a bow area of the adjusting slide block 9 dipping into this receiving device 20. The form-locking connection between the receiving device 20, that is, the gripping arm 17 and the bow area of the adjusting slide block 9 is established by a swivel hook arrangement 19 which is linked to the gripping arm 17. By means of detent points 18a, 18b molded to an underside of the gripping arm 17, the swivel hook arrangement 19 can be locked in the release position as well as in the detent position. In the detent position, the fork-shaped leg sections of the hinge hook arrangement 19 form-lockingly reach around the bow area of the adjusting slide block 9.

The gripping arm 17 is displaceably disposed in the bearing 15 of the steering column tube collar 14. For this purpose, the gripping arm (FIG. 4), which is designed as a flat elongated profile, penetrates a bearing roller 21 which is arranged in a bearing sleeve 25. The bearing sleeve 25 is a one-piece part of the steering column tube collar 14. In addition, the bearing 15 has a bearing cap which is provided with lateral spring tongues 23. The lateral spring tongues 23 have pins projecting toward the gripping arm 17, on which pins the bearing roller 21 is held and which support the gripping arm 17 on its opposite side edges in the area of lateral longitudinal grooves 24. In addition, the bearing roller 21 has spring tongues 22 which press from above onto the gripping arm 17 and which press the gripping arm 17 against the bottom of the bearing roller 21. The opening of the bearing roller 21, through which the gripping arm 17 penetrates, allows a play in the transverse direction as well as in the vertical direction for the movement of the gripping arm 17, the respective play being preloaded by the spring elements 22, 23 in order to centrally guide the gripping arm 17.

By means of the described bearing 15 of the gripping arrangement 5, the gripping arm 17 is therefore additionally slightly swivellably in its displacement plane about a corresponding vertical axis and is tiltable by certain amounts about the axis of rotation of the bearing roller 21.

Figure 7:
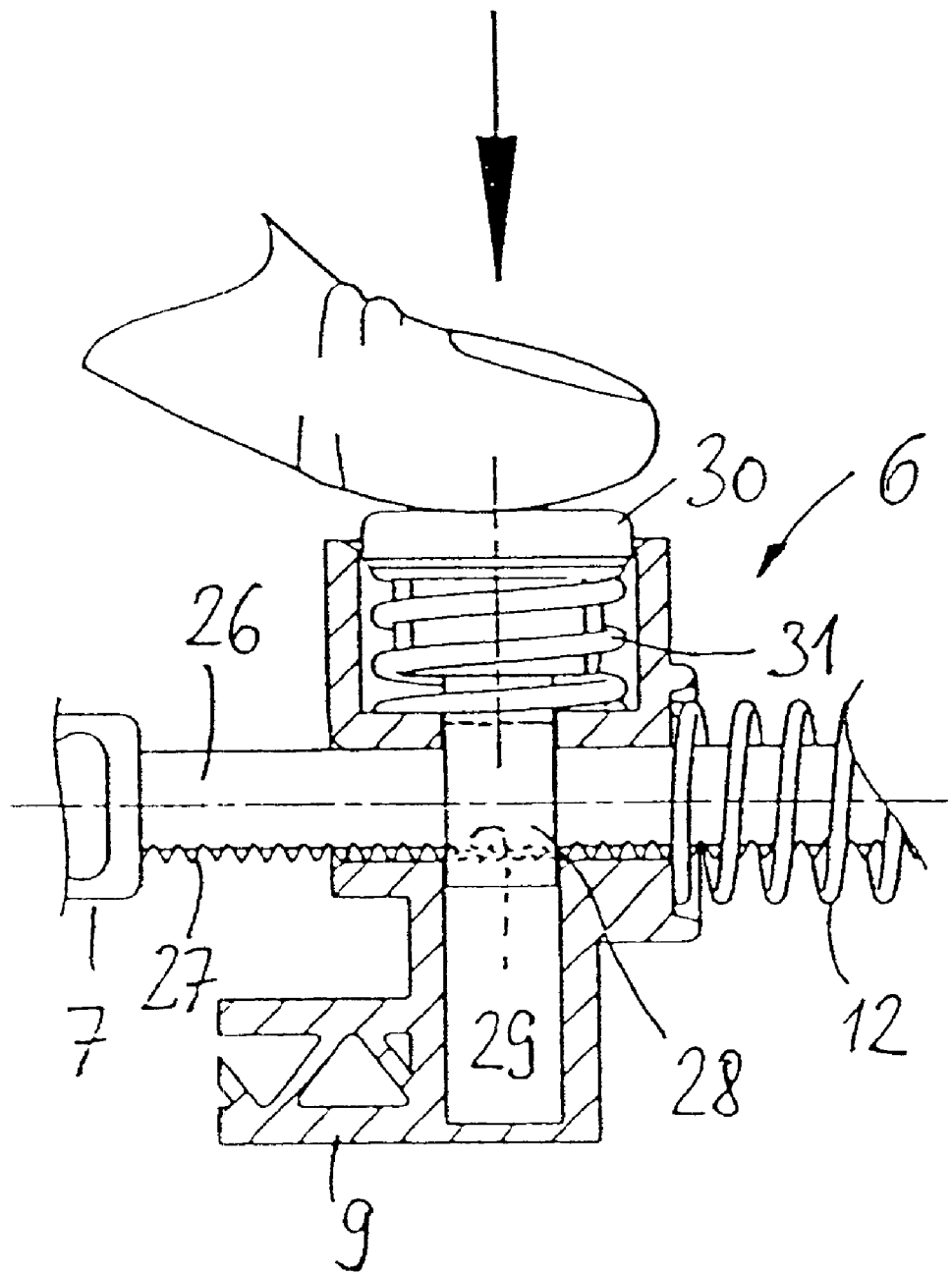
FIG. 7 is an enlarged sectional view of a longitudinal section of a tolerance compensation unit of the adjusting device according to FIG. 1.

The tolerance compensation unit 6, 11, 12 (FIG. 7) arranged between the clamping lever 4 and the adjusting slide block 9 has a slide block which is connected in one piece with the connection arm of the adjusting slide block. The connection slide block is held on the setting rod 26 (FIG. 7). In order to permit a form-locking detent of the connection slide block on the setting rod 26, the setting rod 26 is provided with a teeth 27. In the connection slide block, a detent bow 28, which encloses the setting rod 26 in a box-type or ring type manner, is disposed to be linearly movable transversely to the setting rod 26. An interior wall of the detent bow 28 assigned to the teeth 27 has corresponding internal teeth 29 which, in the locked condition, engages in the teeth 27 and provides a direct force transmission between the adjusting slide block 9 and that coupling unit 7, that is clamping lever 4. The detent bow 28 is connected with an actuating button 30 and is held by means of a pressure spring arrangement 31 in the detent position engaging in the teeth 27. By a manual pressing on the actuating button 30 (direction of the arrow in FIG. 7), the detent bow 28 is released from the setting rod 26 so that a setting can be achieved between the position of the adjusting slide block 9 and the position of the clamping lever 4. A restoring spring arrangement 12 is also assigned to the connection slide block on the setting rod 26, which restoring spring arrangement 12 is supported on an end-side holding button 11 which is releasably fixed on the front side on the setting rod 26. For fixing the holding button 11 on the setting rod 26, a detent connection is provided. The restoring spring arrangement 12 exercises a pressure load onto the connection slide block, by which pressure load the connection slide block is pressure-loaded in the direction of the holding fork 7.

In order to achieve the desired positions between the adjusting slide block and the clamping lever 4 as well as the grip arrangement 5 as a function of the mounting and manufacturing tolerances of the adjusting arrangement as well as of the steering column tube 1, the detent bow is released in a simple manner by the actuating button 30 and the desired position of the connection slide block is set on the setting rod 26. In this case, it must be ensured that the adjusting slide block 9, in the two end positions of the clamping lever 4, that is, in the released clearing position as well as in the fixed detent position, if possible, is not yet situated at the end stop of the guide rail arrangement 10. In addition, the respective position must be set such that, as a result of its corresponding translational movement, the adjusting slide block 9 can also go along on the entire swivelling path of the clamping lever 4.

The bearing forces between the adjusting slide block and the guide rail arrangement 10, on the one hand, as well as between the coupling unit 7 and the clamping lever 4, on the other hand, as well as between the grip arrangement 5 and the clamping lever 4 as well as between the grip arrangement 5 and the steering column tube collar 14 are mutually coordinated such that, during a longitudinal adjustment of the steering column tube 1, the adjusting slide block 9, including the clamping lever 4 as well as the tolerance compensation unit 6 and the grip arrangement 5 remains stationary. The guide rail arrangement 10 of the steering column tube 1 is therefore displaced with respect to the adjusting slide block 9 when the steering column tube 1 is longitudinally adjusted. As a result, it is ensured that clamping lever 4, which is fixed to the vehicle console, remains in its respective adjusted end position; that is, that a longitudinal adjustment of the steering column tube 1 does not unintentionally result in a clamping of the lamellar bundles.

The foregoing disclosure has been set forth merely to illustrate the invention and is not intended to be limiting. Since modifications of the disclosed embodiments incorporating the spirit and substance of the invention-may occur to persons skilled in the art, the invention should be construed to include everything within the scope of the appended claims and equivalents thereof.

What is claimed is:

1. Adjusting arrangement for a steering column tube of a steering system of a motor vehicle, having a swivellably disposed clamping lever which, in a released position, unblocks or, in a locked position, blocks a longitudinal or vertical displacement of the steering column tube, and having an actuating device for the manual releasing or locking of the clamping lever, which actuating device has a grip arrangement which, in a vehicle-fixed mounted condition, is accessible from a driver seat position, said adjusting arrangement comprising:

a guide rail arrangement positioned on the steering column tube and aligned in a longitudinal direction of the steering column tube;

an adjusting slide block displaceably held on said guide rail arrangement, said adjusting slide block being movable by said grip arrangement and being connected with the clamping lever.

2. Adjusting arrangement according to claim 1, wherein for guiding of the adjusting slide block on the guide rail arrangement, swiveling of the clamping lever and a bearing of the grip arrangement are mutually coordinated in their guiding and bearing friction forces so that, during a longitudinal adjustment of the steering column tube, the steering-column-tube-fixed guide rail arrangement can be displaced with respect to the adjusting slide block which is stationarily held by the clamping lever and the grip arrangement.

3. Adjusting arrangement according to claim 1, wherein the adjusting slide block is connected with the clamping lever by means of a coupling unit which compensates for the translational mobility of the adjusting slide block with respect to the rotatory mobility of the clamping lever.

4. Adjusting arrangement according to claim 1, further including a tolerance compensation unit integrated in the connection between the adjusting slide block and the clamping lever or between the adjusting slide block and the grip arrangement.

5. Adjusting arrangement according to claim 4, wherein the tolerance compensation unit is a setting mechanism provided between the clamping lever and the adjusting slide block.

6. Adjusting arrangement according to claim 5, wherein
   the setting mechanism includes a setting rod provided with first teeth and a sliding block which can be displaced on the setting rod, which sliding block has a locking member provided with corresponding second teeth, which locking member is manually changed into a released position and is spring-loaded such that it can automatically be restored into its locked position.

7. Adjusting arrangement according to claim 6, wherein the sliding block is spring-loaded by a restoring spring arrangement in a moving direction.

8. Adjusting arrangement according to claim 7, wherein the restoring spring arrangement is coaxially arranged on the setting rod.

9. Adjusting arrangement according to claim 1, wherein the grip arrangement is displaceably disposed in a vehicle-fixed steering column tube collar by means of a bearing which has bearing elements having a play such that the grip arrangement can carry out compensating movements about at least one axis extending transversely to the sliding direction.

10. Adjusting arrangement according to claim 9, wherein the grip arrangement has an elongated gripping arm, which is coupled to the adjusting slide block, and a gripping element, which is accessible from the driver seat position.

11. Adjusting arrangement according to claim 10, wherein the coupling of the gripping arm to the adjusting slide block is designed as a releasable locking mechanism.

12. Adjusting arrangement according to claim 10, wherein the gripping arm extends radially through a central opening of a bearing roller serving as a bearing element, which bearing roller is disposed to be tiltable about a horizontal axis of rotation extending transversely to the sliding direction of the gripping arm.

13. Adjusting arrangement according to claim 12, wherein the opening of the bearing roller, through which the gripping arm penetrates, is larger in its width as well as in its height than the outer dimensions of the gripping arm.

14. Adjusting arrangement according to claim 13, wherein the spring elements are integrated in the bearing roller and hold the gripping arm under prestress in a central guiding position.

15. A steering column adjustment structure for a motor vehicle, comprising:
   a steering column tube;
   a swivelable clamping lever having a first locked position for blocking longitudinal or vertical displacement of said steering column tube and a second release position for unblocking said longitudinal or vertical displacement of the steering column tube;
   an actuating device for manually controlling said clamping lever, said actuating device including a grip arrangement accessible from a driver seat position;
   a guide rail arrangement positioned on said steering column tube and aligned in a longitudinal direction of said steering column;
   an adjusting slide block connected with said clamping lever and positioned on said guide rail arrangement wherein said adjusting slid block is controlled by said grip arrangement.

* * * * *